United States Patent
Kang et al.

(10) Patent No.: US 11,104,810 B2
(45) Date of Patent: Aug. 31, 2021

(54) STRUCTURE FOR PREVENTING ADHESION OF MICROORGANISMS AND METHOD OF MANUFACTURING THE SAME

(71) Applicant: INDUSTRY-ACADEMIC COOPERATION FOUNDATION, YONSEI UNIVERSITY, Seoul (KR)

(72) Inventors: Shinill Kang, Seoul (KR); Taekyung Kim, Seoul (KR); Myungki Jung, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 16/735,922

(22) Filed: Jan. 7, 2020

(65) Prior Publication Data

US 2020/0148897 A1    May 14, 2020

Related U.S. Application Data

(62) Division of application No. 15/848,206, filed on Dec. 20, 2017, now abandoned.

(51) Int. Cl.
*C09D 5/16* (2006.01)
*B29C 59/02* (2006.01)
(Continued)

(52) U.S. Cl.
CPC ........... *C09D 5/1681* (2013.01); *A01N 25/34* (2013.01); *A01N 59/16* (2013.01); *A01N 59/20* (2013.01); *B08B 17/065* (2013.01); *B29C 43/56* (2013.01); *B29C 59/026* (2013.01); *B29C 59/022* (2013.01); *B29C 2035/0827* (2013.01); *B29C 2043/568* (2013.01); *B29C 2059/023* (2013.01);
(Continued)

(58) Field of Classification Search
CPC ...... C09D 5/1681; A01N 25/34; A01N 59/16; A01N 59/20; B29C 59/026; B29C 43/56; B29C 2059/023; B29C 2035/0827; B29C 59/022; B29C 2043/568; B29C 43/021; B29C 2043/026; B29C 43/003; B08B 17/065; B29K 2105/162; B29K 2505/08
See application file for complete search history.

(56) References Cited

U.S. PATENT DOCUMENTS

| | | | |
|---|---|---|---|
| 2013/0251942 A1* | 9/2013 | Azimi | B32B 18/00 428/141 |
| 2013/0251948 A1* | 9/2013 | Lyons | B08B 17/065 428/148 |
| 2019/0091950 A1* | 3/2019 | Hernandez Rueda | B29C 59/022 |

* cited by examiner

*Primary Examiner* — Nathan L Van Sell
(74) *Attorney, Agent, or Firm* — STIP Law Group, LLC

(57) ABSTRACT

The present invention relates to a structure for preventing the adhesion of microorganisms, which is capable of preventing microorganisms from adhering to and growing on a surface of an object, and a method of manufacturing the same. The structure for preventing the adhesion of microorganisms includes: a nano-structure configured to include a plurality of protruding structures each having a sharp end, and made of a resin composition; and a plurality of nano-metal particles configured to be distributed inside the nano-structure. A method of manufacturing a structure for preventing adhesion of microorganisms includes preparing a liquid resin; mixing the liquid resin with nano-metal particles; depositing the liquid resin on a substrate; pressing the liquid resin with a master template on which a pattern corresponding to a plurality of protruding structures is formed; and setting or curing the liquid resin.

2 Claims, 12 Drawing Sheets

(51) Int. Cl.
*B29C 43/56* (2006.01)
*B29K 105/16* (2006.01)
*B29K 505/08* (2006.01)
*B29C 35/08* (2006.01)
*A01N 59/16* (2006.01)
*B08B 17/06* (2006.01)
*A01N 59/20* (2006.01)
*A01N 25/34* (2006.01)

(52) U.S. Cl.
CPC .... *B29K 2105/162* (2013.01); *B29K 2505/08* (2013.01)

STRUCTURE FOR PREVENTING ADHESION OF MICROORGANISMS AND METHOD OF MANUFACTURING THE SAME

CROSS-REFERENCES TO RELATED APPLICATION

This application is a Divisional Application of U.S. patent application Ser. No. 15/848,206, which was filed on Dec. 20, 2017, the contents of which are incorporated herein by reference.

BACKGROUND

1. Technical Field

The present invention relates generally to a structure for preventing the adhesion of microorganisms and a method of manufacturing the same, and more specifically to a structure for preventing the adhesion of microorganisms, which is capable of preventing microorganisms from adhering to and growing on a surface of an object by means of a micro- or nano-pattern and nano-metal particles, and a method of manufacturing the same.

2. Description of the Related Art

Generally, cases where microorganisms float and survive individually are few. In most cases, microorganisms form three-dimensional (3D) structures by means of polymer materials produced by them. Such a 3D structure is called a biofilm. A biofilm formed by microorganisms may be formed on almost all types of solid surfaces or the tissues of living creatures.

FIG. 1 shows a process in which microorganisms adhere to a surface of a solid object and form a biofilm. When microorganisms floating in the air adhere to a surface of a solid object, the microorganisms secrete a polymer material, form a biofilm, and grow in the state in which the biofilm has been formed. Furthermore, when the microorganisms continue to grow, the biofilm grows also. At some point, part of the microorganisms is separated from the biofilm, and floats in the air.

In particular, in an infection process, pathogens may form biofilms on medical instruments, such as catheters, various types of implants, artificial organs, etc., and may also form biofilms on all types of artificial structures, such as water service pipes, sewer pipes, water purifiers, air purification facilities, etc, which are accessible to microorganisms. Accordingly, preventing a biofilm from being formed has long been a concern for various technical fields, such as the civil engineering field, the architectural field, the urban engineering field, and the environmental engineering field, etc., as well as the medical field.

Therefore, in order to prevent microorganisms from growing, it is necessary to prevent microorganisms from adhering to and forming a biofilm on a surface of a solid object. For this purpose, a technology of forming a micro- or nano-pattern on a surface is known. FIG. 2 is a sectional view showing a micro- or nano-pattern disclosed in EP 2 979 844 published on Feb. 3, 2016. In this patent, a synthetic polymer film 34A is formed on a base film 42A, and a plurality of raised portions 34Ap is formed on the synthetic polymer film 34A. The raised portions 34Ap of the above-described structure are formed in sharp protruding shapes. The raised portions 34Ap destruct the cell walls of microorganisms or bacteria, thereby preventing microorganisms from adhering to and growing on a surface of the structure.

A technology of coating a surface of a solid object with nano-particles of a metal, such as copper or silver, is known as another microorganism growth prevention technology. It is known that when nano-particles of copper or silver penetrate into microorganisms, the microbial metabolism of the microorganisms is disrupted and thus a sterilization effect is achieved. Generally, a deposition technology, such as sputtering or ion plating, is chiefly used to form or apply such nano-metal particles on a surface of a solid object.

Although various technologies for preventing microorganisms from adhering to and growing on a surface are known, as described above, the use of only the nano-metal particle coating or micro-structures having tips has limitations on achieving sufficient sterilization capability.

Furthermore, according to Japanese Unexamined Patent Application Publication No. 2009-174031, in order to coat a surface of an object with nano-metal particles, a sputtering process is used, or a technology of generating a nano-metal particle colloid by reacting a porous carrier with a metal precursor and fixing metal nano-particles onto a surface of a processing target object in the metal nano-particles colloid is used. However, these conventional nano-metal particle coating technologies require a high cost or a complex process, which is a cause of an increase in manufacturing cost.

SUMMARY

The present invention has been conceived to overcome the above-described problems of the prior art, and an object of the present invention is to provide a structure for preventing the adhesion of microorganisms, which can provide a microorganism adhesion prevention effect considerably improved over the effect of the conventional structures for preventing the adhesion of microorganisms, and to also provide a method of manufacturing the structure for preventing the adhesion of microorganisms, which can economically and conveniently manufacture the structure for preventing the adhesion of microorganisms.

According to an aspect of the present invention, there is provided a structure for preventing the adhesion of microorganisms, which is capable of preventing microorganisms from adhering to and growing on a surface of an object, the structure including: a nano-structure configured to include a plurality of protruding structures for preventing the adhesion of microorganisms, and made of a resin composition; and a plurality of nano-metal particles configured to be distributed in the nano-structure; wherein the distribution of the nano-metal particles is controlled by means of an electric field so that the nano-metal particles are distributed in larger quantities in a direction toward a surface of the nano-structure.

The protruding structures may be a plurality of tip-shaped structures each having a sharp end.

The protruding structures may be one of sinusoidal structures, column-shaped structures, and inverted U-shaped structures.

The plurality of nano-metal particles may be made of one or more metals selected from the group consisting of copper Cu, silver Ag, platinum Pt, gold Au, zinc Zn, and palladium Pd.

The plurality of nano-metal particles may be distributed on the surface of the nano-structure.

The plurality of nano-metal particles may be distributed inside the nano-structure, and the density of the distribution of the nano-metal particles may decrease in a direction inward from the surface of the nano-structure.

According to another aspect of the present invention, there is provided a method of manufacturing a structure for preventing adhesion of microorganisms, which is capable of preventing microorganisms from adhering to and growing on a surface of an object, the method including: preparing a liquid resin; mixing the liquid resin with nano-metal particles; depositing the liquid resin on a substrate; pressing the liquid resin with a master template on which a pattern corresponding to a plurality of protruding structures is formed; controlling the distribution of the nano-metal particles by applying an electric field to the master template; and setting or curing the liquid resin.

The method may further include, after setting or curing the liquid resin, performing a post process so that the nano-metal particles are exposed out of a surface of the set or cured resin.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
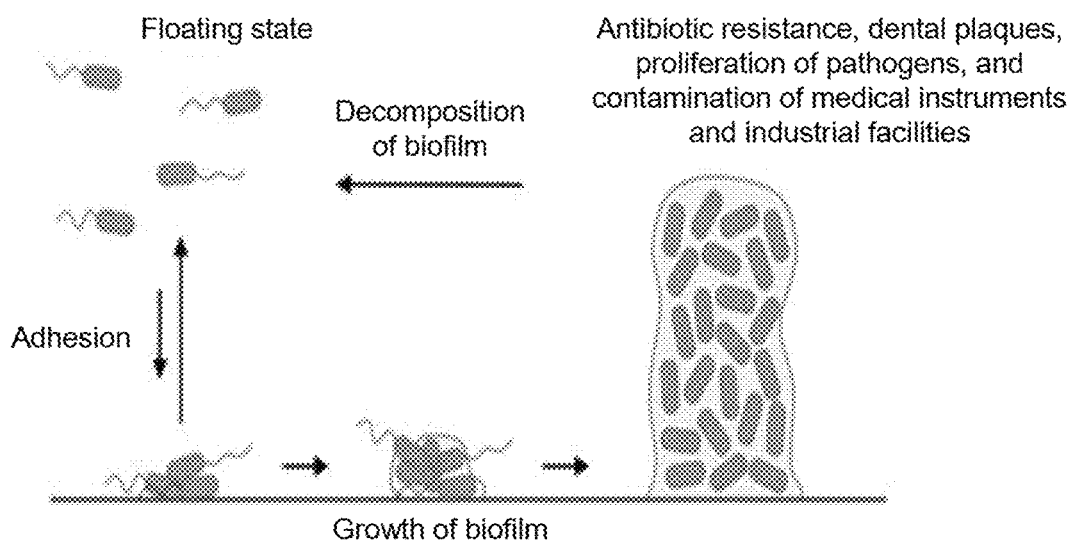
FIG. 1 is a conceptual diagram showing a process in which microorganisms adhere to a surface of a structure and form a biofilm.
Figure 2:
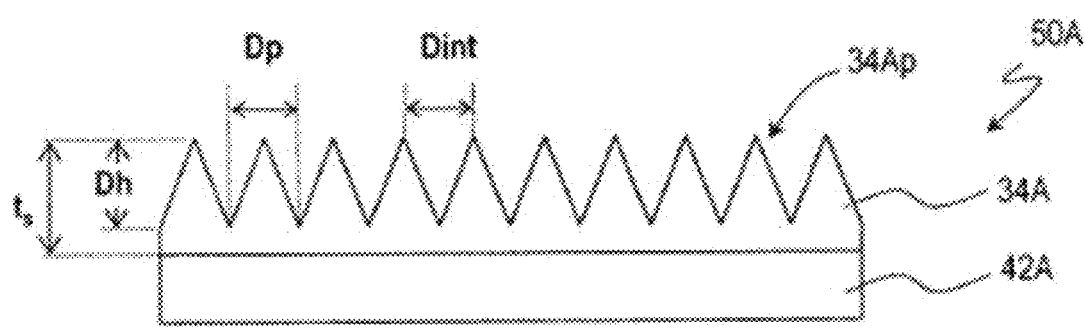
FIG. 2 shows a conventional structure for preventing the adhesion of microorganisms.
Figure 3:
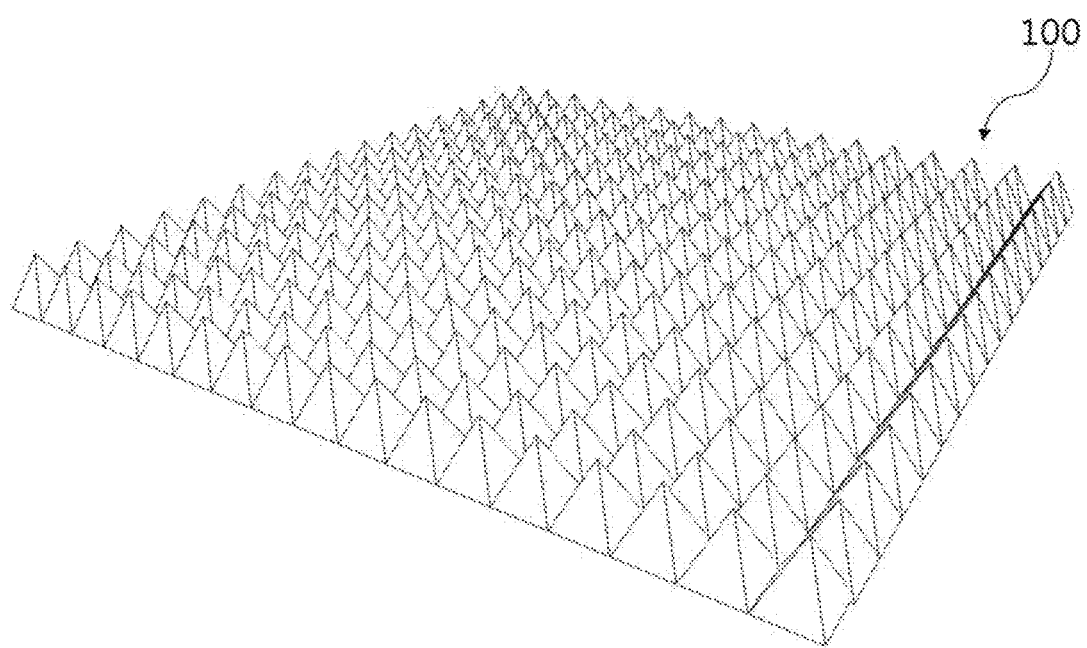
FIG. 3 is a perspective view of a structure for preventing the adhesion of microorganisms according to a first embodiment of the present invention.

FIG. 3 is a perspective view of a structure 100 for preventing the adhesion of microorganisms according to a first embodiment of the present invention. The structure for preventing the adhesion of microorganisms includes a set of tip-shaped structures each having a sharp end. The tip-shaped structures are generally fabricated in pyramid or cone shapes.

Although the structure for preventing the adhesion of microorganisms is configured to include the set of tip-shaped structures each having a sharp end in order to maximize a sterilization effect in the embodiment shown in FIG. 3, the structure for preventing the adhesion of microorganisms is not limited to the tip-shaped structures as long as protruding structures capable of preventing microorganisms from adhering to a surface of an object are used. For example, a plurality of sinusoidal structures, column-shaped structures, and inverted U-shaped structures protruding from a plane can also prevent microorganisms from adhering to a surface of an object.

Although the present invention will be described below with a focus on tip-shaped structures capable of providing a maximized effect, it will be apparent to a person skilled in the art that the following description can be also applied to protruding structures (sinusoidal structures, column-shaped structures, inverted U-shaped structures, etc.), other than the tip-shaped structures.

Figure 4:
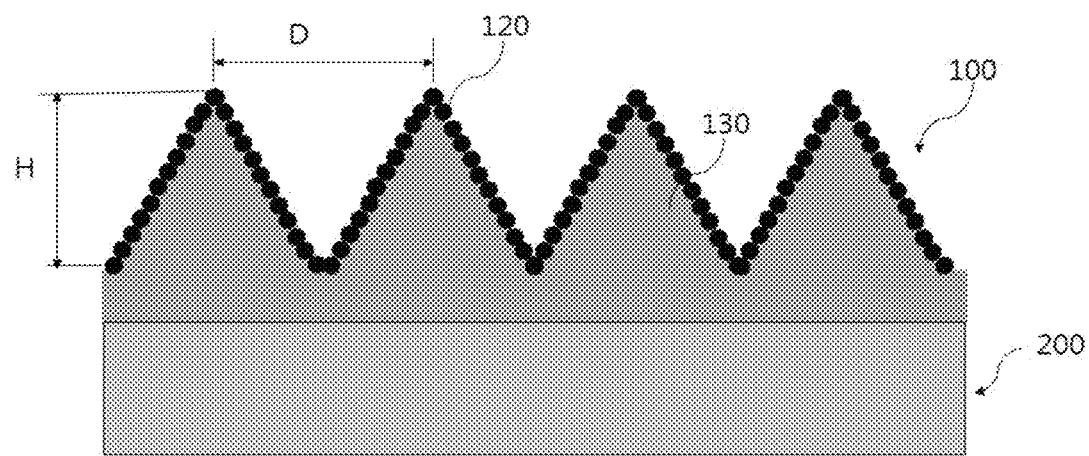
FIG. 4 is a side sectional view of the structure for preventing the adhesion of microorganisms according to the first embodiment of the present invention.

FIG. 4 is a sectional view of the structure 100 for preventing the adhesion of microorganisms according to the first embodiment of the present invention. The structure 100 for preventing the adhesion of microorganisms is formed on a substrate 200. The structure 100 for preventing the adhesion of microorganisms includes: a nano-structure 130 made of a polymer resin; and nano-metal particles 120 formed on a surface of the nano-structure 130. In this case, the substrate 200 may be a surface of a device which requires that a structure for preventing the adhesion of microorganisms is formed thereon.

Furthermore, the nano-structure 130 includes a plurality of tip-shaped structures each having a sharp end. Although the tip-shaped structures may be generally pyramid-shaped structures or cone-shaped structures, they are not limited to a specific shape as long as they are shaped to have sharp ends and can thus influence the cell membranes of microorganism.

The nano-structure 130 is made of a resin composition for the sake of ease of manufacture. For example, the nano-structure 130 is made of an ultraviolet curable resin composition which remains in a liquid phase before curing and is solidified when ultraviolet rays are radiated thereonto. Although the ultraviolet curable resin composition includes acryl- or epoxy-based ultraviolet curable resin compositions, the ultraviolet curable resin composition is not limited thereto as long as an ultraviolet curable resin composition which is in a liquid phase before curing and is transformed into a solid phase after curing is employed. Moreover, the nano-structure 130 according to the present invention may be also made of a thermosetting resin composition, such as a phenol resin, an epoxy resin, or the like.

The dimensions of the tip-shaped structures constituting part of the nano-structure 130 may vary depending on a sterilization target. Generally, it was found that a desirable effect was achieved when the distance (pitch; D) between the tips of the tip-shaped structures ranged from 200 to 300 nm and the vertical distance (height; H) from the bottoms of the tip-shaped structures to the tips thereof ranged from 300 to 500 nm.

For reference, although the effect will increase as the height H of the tip-shaped structures increases, the height H of the tip-shaped structures may be determined at a appropriate level (which is two or more times the width of the tip-shapes structures) by taking into account the limitations of technology for manufacturing a nano-structure, manufacturing cost, etc. Furthermore, the pitch of the tip-shaped structures may be designed to be ½ to ⅓ of the size of microorganisms (bacteria).

The nano-metal particles 120 are not limited to a specific type of metal as long as the metal of the nano-metal particles 120 is effective in sterilization. It is generally known that nano-particles of copper Cu, silver Ag, platinum Pt, gold Au, zinc Zn, and palladium Pd have desirable effects. The optimum size of the nano-metal particles 120 may vary depending on a sterilization target.

According to the first embodiment of the present invention, when microorganisms approach the structure 100 for preventing the adhesion of microorganisms, the nano-metal particles 120 present on the surface of the structure 100 for preventing the adhesion of microorganisms penetrate into the microorganisms and then disrupt the microbial metabolism of the microorganisms. In this case, when the tips of the nano-structure 130 destruct the cell membranes of the microorganisms, a sterilization effect is amplified. Accordingly, this can achieve an improved effect compared to a case where only a nano-structure or nano-metal particles are present.

Figure 5:
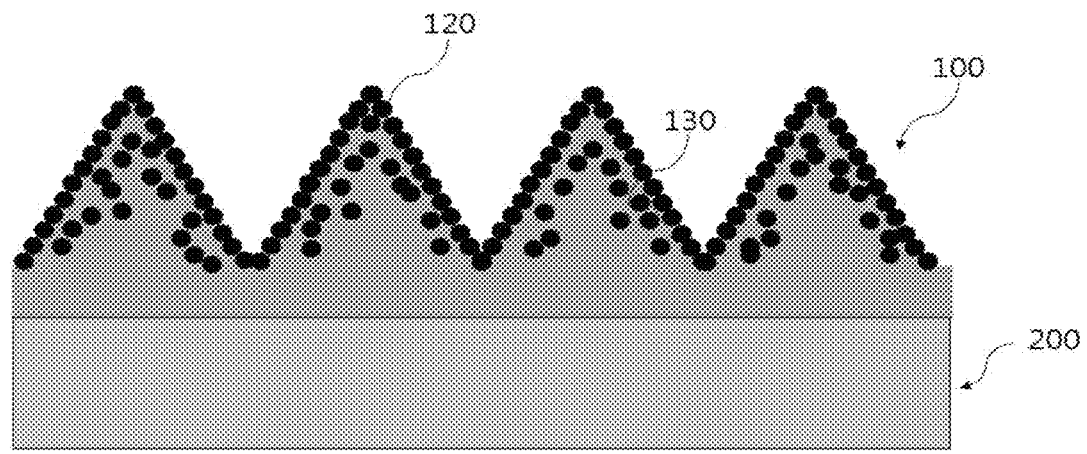
FIG. 5 is a side sectional view of a structure for preventing the adhesion of microorganisms according to a second embodiment of the present invention.

FIG. 5 is a sectional view of a structure 100 for preventing the adhesion of microorganisms according to a second embodiment of the present invention. The structure 100 for preventing the adhesion of microorganisms according to the second embodiment of the present invention is different in the distribution of nano-metal particles 120 from the structure 100 for preventing the adhesion of microorganisms according to the first embodiment of the present invention. The nano-metal particles 120 are concentrated on the surface of the nano-structure 130 in the first embodiment, whereas nano-metal particles 120 are additionally distributed inside a nano-structure 130 in the second embodiment.

Generally, it is advantageous in a cost-effectiveness aspect that all the nano-metal particles 120 are concentrated on the surface of the nano-structure. Meanwhile, when the structure 100 for preventing the adhesion of microorganisms is used in an environment where it is difficult to replace the structure 100, nano-metal particles present on the surface of the nano-structure 130 may be lost due to abrasion or the like attributable to long-term use. In contrast, when a structure for preventing the adhesion of microorganisms, such as that according to the second embodiment, is utilized, metal nano-particles 120 present inside the surface continue to perform a sterilization function in place of the lost nano-metal particles. In this case, although the metal nano-particles 120 may be uniformly distributed throughout the inside of the nano-structure 130, the density of the distribution of the metal nano-particles 120 may be highest on the surface of the nano-structure 130, and may decrease in a direction inward from the surface of the nano-structure 130.

Figure 6:
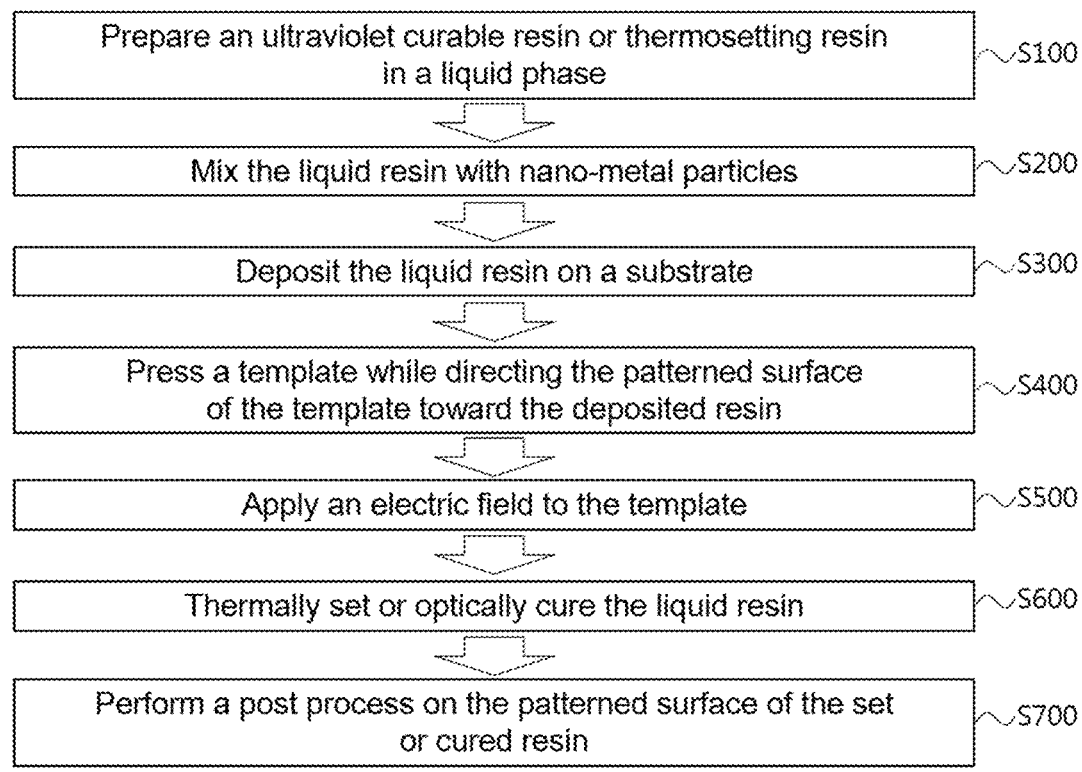
FIG. 6 is a flowchart showing a process of manufacturing a structure for preventing the adhesion of microorganisms according to the present invention.

FIG. 6 is a flowchart showing a process of manufacturing a structure for preventing the adhesion of microorganisms according to the present invention, and FIGS. 7 to 12 show the individual steps of the above process shown in the flowchart.

Figure 7:
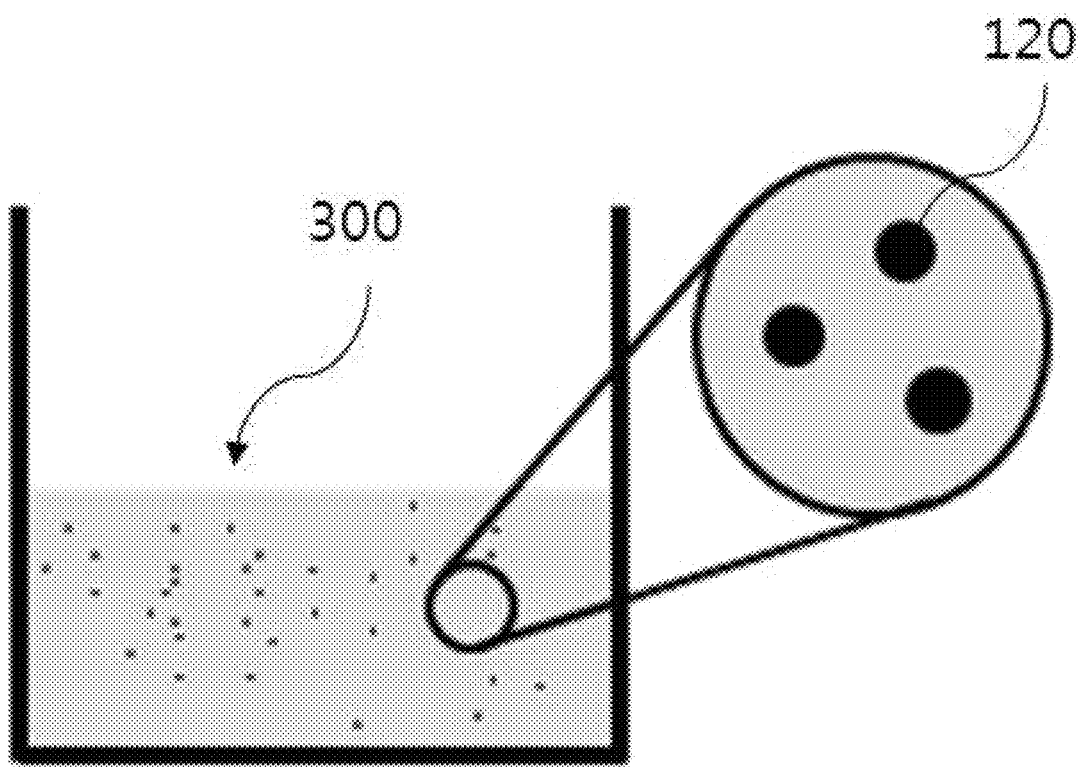
FIG. 7 shows a state in which nano-metal particles have been mixed with a liquid resin.

Referring to FIG. 7, step S100 of preparing a liquid resin and step S200 of mixing the prepared liquid resin with nano-metal particles are performed. Although the liquid resin may be an ultraviolet curable resin, a thermosetting resin may be used as the liquid resin. Although it may be helpful to a post process to uniformly distribute the nano-metal particles inside the liquid resin, the nano-metal particles are redistributed inside the liquid resin due to an electric field, and thus the uniformity of the nano-metal particles is of no particular importance.

Figure 8:
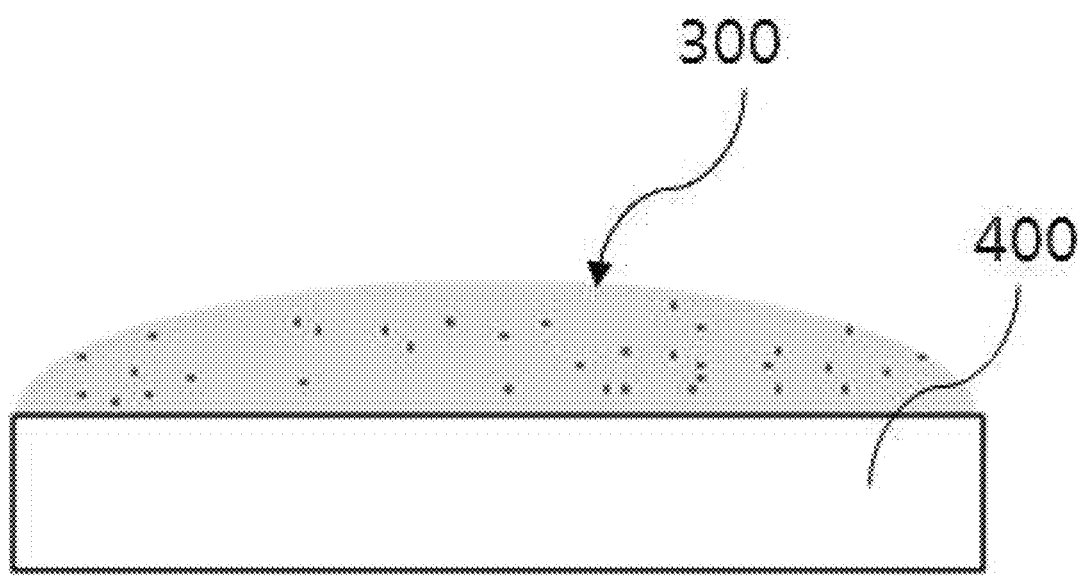
FIG. 8 shows a state in which the liquid resin has been deposited onto a substrate.

FIG. 8 shows step S300 of depositing the prepared liquid resin 300, mixed with the nano-metal particles at step S200, on a substrate 400. In this case, the substrate 400 is a manufacturing tool temporarily used for the process of manufacturing a structure for preventing the adhesion of microorganisms, and is distinct from the above-described substrate 200.

Figure 9:
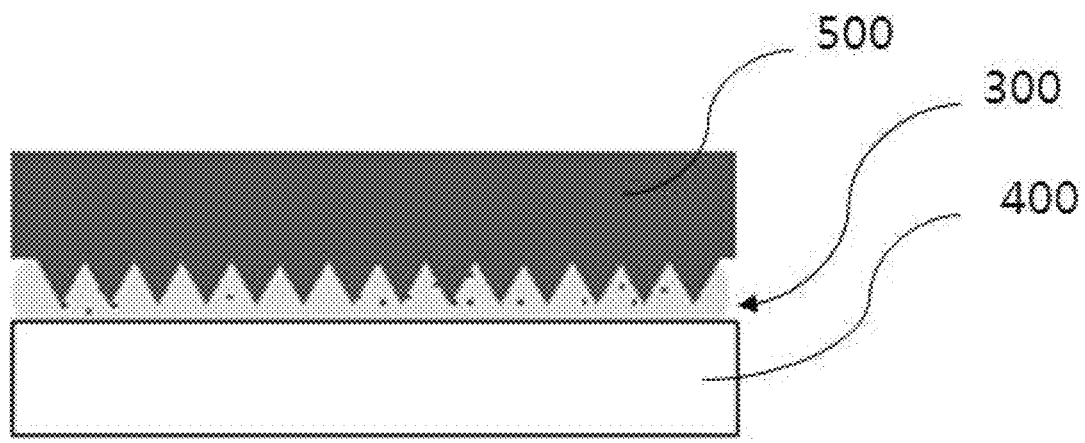
FIG. 9 shows a state in which a pattern has been formed on the liquid resin by pressing the liquid resin deposited on the substrate with a master template.

FIG. 9 shows step 400 of placing a master template 500 on the liquid resin 300 deposited on the substrate 400 and pressing the liquid resin 300 with the master template 500. A pattern having a shape corresponding to the shape of a nano-structure 130 including tip-shaped structures is formed on a surface of the master template 500, and a surface of the liquid resin 300 is formed in a shape corresponding to the shape of the pattern.

Figure 10:
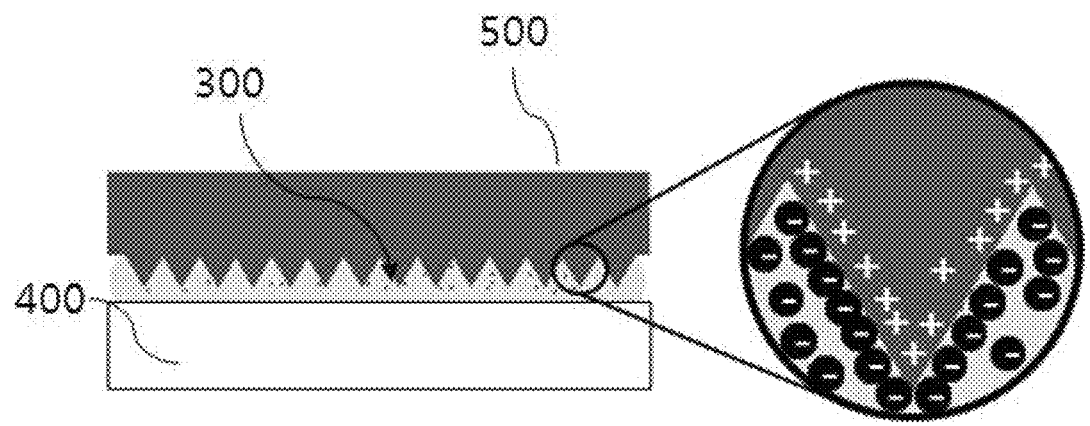
FIG. 10 shows a state in which the distribution of the metal nano-particles mixed with the liquid resin has been controlled by applying an electric field to the master template.

FIG. 10 shows step S500 of applying an electric field to the master template 500. When a positive electric field is applied as an example, the nano-metal particles 120 distributed inside the liquid resin 300 are moved within the resin, i.e., a liquid, by the force of the electric field, with the result that the nano-metal particles 120 are moved toward a portion where the master template 500 and the liquid resin 300 come into contact with each other. Therefore, the shape of the distribution of the nano-metal particles 120 inside the liquid resin 300 can be controlling by adjusting the strength of the electric field and the time for which the electric field is applied.

Figure 11:
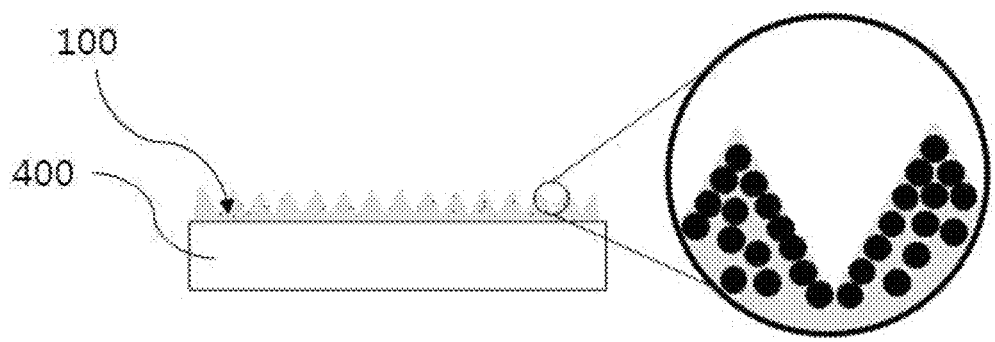
FIG. 11 shows a state in which a solidified nano-structure has been formed by setting or curing the liquid resin.

FIG. 11 shows step S600 of thermally setting or optically curing the liquid resin. Through the setting or curing process, the resin having flowability loses flowability and is solidified, and thus the nano-structure 120 is formed.

Figure 12:
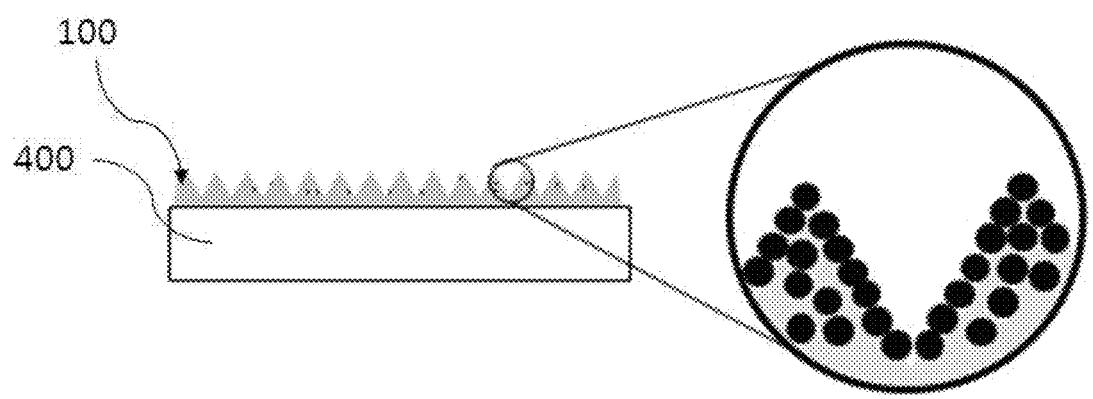
FIG. 12 shows a state in which the metal nano-particles have been exposed out of the nano-structure by eliminating a resin material from a surface of the solidified structure of FIG. 11.

FIG. 12 shows step S700 of performing a post process on the patterned surface of the set or cured resin. This step is performed to eliminate a thin resin film covering the nano-metal particles 120 so that nano-metal particles 120 present near the surface of the nano-structure 120 can be exposed out of the nano-structure 120. Although this step may be performed through blasting, the step is not limited to a specific method as long as a method for performing this step can eliminate the thin resin film.

The structure for preventing the adhesion of microorganisms manufactured using the above-described method may be used to prevent biofilms to be formed on medical instruments, such as catheters, various types of implants, artificial organs, etc., and may be applied to all types of artificial structures, such as water service pipes, sewer pipes, water purifiers, air purification facilities, etc, which are accessible to microorganisms.

The structure for preventing the adhesion of microorganisms according to the present invention is made of a polymer resin which is relatively inexpensive and is easy to handle, has protruding shapes capable of preventing microorganisms from adhering to the surface of the structure, and includes distributed nano-metal particles, so that the adhesion of microorganisms to the surface can be delayed and the nano-metal particles can penetrate into the cells of the microorganisms, thereby providing sterilization capability.

Furthermore, when the protruding nano-structures are a plurality of tip-shaped structures each having a sharp end, the cell membranes of microorganisms are destructed by tips, and the nano-metal particles can easily penetrate into the cells of the microorganism, thereby maximizing sterilization capability.

Moreover, according to the present invention, the nano-metal particles are disposed using a method of distributing nano-metal particles toward the surface of the structure by inducing the nano-metal particles floating inside the polymer resin before setting or curing to move in an electrical manner, rather than a method such as sputtering or the like, and thus a manufacturing process is simplified and manufacturing cost can be significantly reduced.

Although the specific embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A method of manufacturing a structure for preventing adhesion of microorganisms, which is capable of preventing microorganisms from adhering to and growing on a surface of an object, the method comprising:
    preparing a liquid resin;
    mixing the liquid resin with a plurality of nano-metal particles;
    depositing the liquid resin on a substrate;
    pressing the liquid resin with a master template on which a pattern corresponding to a plurality of protruding structures is formed;
    controlling the nano-metal particles in the liquid resin to be concentrated around a top surface of the protruding structures by applying an electric field to the master template;
    setting or curing the liquid resin; and
    after setting or curing the liquid resin, performing a post process so that the plurality of nano-metal particles are exposed out of a surface of the set or cured resin.

2. The method of claim 1, wherein the plurality of nano-metal particles is made of one or more metals selected from the group consisting of copper Cu, silver Ag, platinum Pt, gold Au, zinc Zn, and palladium Pd.

* * * * *